United States Patent [19]

Pinschmide, Jr. et al.

[11] Patent Number: 5,373,076
[45] Date of Patent: Dec. 13, 1994

[54] FUNCTIONAL OLIGOMERIC VINYLFORMAMIDES AND VINYLAMINES

[75] Inventors: Robert K. Pinschmide, Jr., Allentown; William E. Carroll, Orefield, both of Pa.

[73] Assignee: Air Products and Chemicals, Inc., Allentown, Pa.

[21] Appl. No.: 159,639

[22] Filed: Nov. 30, 1993

Related U.S. Application Data

[63] Continuation-in-part of Ser. No. 913,563, Jul. 14, 1992, Pat. No. 5,280,077.

[51] Int. Cl.$^5$ ............................................. C08F 20/54
[52] U.S. Cl. ................................................... 526/303.1
[58] Field of Search ..................................... 526/303.1

[56] References Cited

U.S. PATENT DOCUMENTS

| | | | |
|---|---|---|---|
| Re. 30,362 | 8/1980 | Gless et al. | 525/355 |
| 4,018,826 | 4/1977 | Glen et al. | 260/583 |
| 4,421,602 | 12/1983 | Brunnmueller et al. | 526/303.1 |
| 4,500,437 | 2/1985 | Engelhardt et al. | 526/303.1 |
| 4,808,683 | 2/1989 | Itagaki et al. | 526/307.2 |
| 4,952,656 | 8/1990 | Lai et al. | 525/328.2 |
| 5,071,934 | 12/1991 | Peiffer | 526/303.1 |
| 5,280,095 | 1/1994 | Aizawa et al. | 526/303.1 |

FOREIGN PATENT DOCUMENTS

| | | | |
|---|---|---|---|
| 1495692 | 5/1973 | Germany | 526/303.1 |
| 9004610 | 5/1990 | WIPO | 526/303.1 |

OTHER PUBLICATIONS

Orszagh et al., Solid–State Polymerization of Acrylamide and its Derivatives . . ., J. Poly. Sci vol. 19 pp. 363–369 1981.

Orszagh, et al., Solid–State Polymerization of Acrylamide and its Derivatives complexed with some Lewis Acids J. Poly Sci vol. 20, pp. 1775–1784 1982.

Hashimoto et al. Living Cationic Polymerization of 2–Vinyloxyethyl Phthalimide: . . . J. Poly Sci vol. 26, pp. 3361–3374, 1988.

Chemistry of Organic Compounds by Noller Oct. 1, 1956 pp. 233–235.

ACS, Advances in Chemistry Series 125, "Fractionation of Linear Polyethylene with Gel Permeation Chromatography" by Nakajima (1973) pp. 98–107.

Sawamoto, The Synthesis of Well–defined Polymers by Living Cationic Polymerization of Vinyl Monomers Trip vol. 1, No. 4 Apr. 1988.

*Primary Examiner*—Joseph L. Schofer
*Assistant Examiner*—N. Sarofim
*Attorney, Agent, or Firm*—Mark L. Rodgers; William F. Marsh

[57] ABSTRACT

Vinylamide oligomers having molecular weights between about 280 and 7,500 are prepared by the cationic polymerization of vinylamides in the presence of a Lewis acid at a temperature between $-100°$ and $100°$ C. The resultant vinylamide oligomers are characterized in that they have a proton initiating group at one end and an aldehyde equivalent at the other end. These vinylamide oligomers can optionally be hydrolyzed under acidic or basic conditions to form the corresponding vinylamine oligomers.

8 Claims, No Drawings

FUNCTIONAL OLIGOMERIC VINYLFORMAMIDES AND VINYLAMINES

CROSS REFERENCE TO RELATED APPLICATION

This is a continuation-in-part of copending U.S. patent application Ser. No. 07/913,563, filed Jul. 14, 1992 now U.S. Pat. No. 5,280,077, the subject matter of which is hereby incorporated by reference.

FIELD OF THE INVENTION

The present invention relates to the polymerization of vinylformamides to form oligomers which can be hydrolyzed to form the corresponding oligomeric vinylamines.

BACKGROUND OF THE INVENTION

Oligomeric materials containing primary amine groups are desirable in numerous applications, particularly coatings, adhesives and curatives for epoxy, isocyanate, aminoplast and other reactive systems. Preparation of low molecular weight or oligomeric primary amine containing polymers has previously been impossible even using the desired precursor monomer N-vinylformamide. Even with use of large amounts of chain transfer agents suitably low molecular weights could not be achieved.

Polymerization of N-vinylformamide (NVF) has been widely reported under free radical conditions to give high molecular weight homo and copolymers. Polymers containing mixtures of primary, secondary and tertiary amine groups (e.g., polyethyleneimine) or oxidatively unstable ethyleneamines (mainly secondary, with terminal primary amines) have been prepared by other routes and used previously.

Vinylamine polymers with molecular weights (Mw) from 3,000 to 6.7 million have been reported. U.S. Pat. No. 4,018,826 and corresponding U.S. Pat. No. Reissue Re.30,362 disclose the preparation of poly(vinylamine) salts of mineral acids by polymerizing vinylacetamide with a free radical polymerization catalyst and hydrolyzing the polymer to the desired amine salts by contacting the p-vinylacetamide with an aqueous solution of the corresponding mineral acid. Poly(vinylamine) product of about 3,000 to about 700,000 molecular weight (4000 to about 1,000,000 for the salt product) is suggested. U.S. Pat. No. 4,808,683 discloses making high molecular weight N-vinylformamide copolymer by free radical polymerization.

Zurakowska-Orszagh, et al., J. Polym. Sci, Polym Chem Ed., 19, 1981, 363–369, describes the synthesis of stable complexes of Lewis acids with acrylamide monomers. These complexes have monomer/Lewis acid molar ratios of 2 to 4, and therefore are basically stoichiometric complexes. These complexes are not polymerized, nor do they polymerize spontaneously. Zurakowska-Orszagh, Mirowski and Chajewski, J. Polym. Sci, Polym Chem Ed., 20, 1982, 1775–84 describes the polymerization of acrylamide monomers in the presence of zinc halide Lewis acids. These polymerizations are not ionic, but clearly initiated by radiation induced free radical processes. The authors specifically cite inhibition by added oxygen, a known free radical inhibitor, as proof of the free radical mechanism.

U.S. Pat. No. 4,952,656 discloses polymerization of NVF to extremely high molecular weight polymers above 3 MM using inverse emulsion conditions. NVF polymers and copolymers have the unusual ability to be hydrolyzed easily under acid or base conditions to the corresponding polyvinylamine, giving polymers with highly reactive primary amine groups or, when protonated, high levels of cationic charge. Such materials have numerous applications as curatives in coatings and adhesives, for papermaking, water treatment, enhance oil recovery, for personal care polymers, in biomedical applications and in mineral recovery.

To prepare free radical polymers, it is well known that oxygen and other radical inhibitors must be removed in order to allow the radical chains to grow, consuming the monomer, without excessive use of expensive initiators. The resulting polymers are also rather high in molecular weight, 600,000 to 2 million under bulk polymerization techniques for vinylamide monomers. Such polymers are highly viscous and difficult to process, even in solution (typically in water, one of the few good solvents for poly-N-vinylformamide (PNVF) or poly-vinylamine (PVAm)). For many applications it is desired to have very low molecular weight polymer, e.g., to give low viscosities or better miscibility and solubility, or in reactive systems to give moderate crosslink densities that prevent the system from becoming too brittle. This is typically done with free radical polymerizations with the addition of chain transfer agents, such as dodecanethiol, bromotrichloromethane, or isopropanol. Such agents add unwanted cost and co- or by-products (such as halogens) to the polymer and result in unwanted high polydispersity or too high molecular weights. Unreacted chain transfer agents are also difficult to remove from the mixture.

Alternatively, the free radical polymerization may be run by delay feeding monomer and/or at high dilution in a solvent. This option gives poor kettle utilization, requires the use of much solvent which may be expensive, toxic or hard to remove and, with NVF, still gives polymers with molecular weights in the 50,000 range at reasonable (10%) monomer levels. Running the polymerization at high temperature with excess initiator, particularly with the delay feeds as described above, is not suitable because of the low thermal stability of NVF in the condensed phase and its tendency to auto decompose to colored byproducts. The added initiator is also a significant cost factor.

In addition to free radical polymerization, amine and formamide containing polymers have been made via other means, such as the condensation of ethylene glycol and ammonia, ethanolamine or ethylenediamine or combinations of these compounds at high temperatures in the presence of a catalyst to give polyethylenepolyamines. Such materials give complex mixtures with mainly secondary and tertiary amines and numerous cyclic, substituted piperazine structures. Such materials have limited thermal and oxidative stability and frequently have color problems. Similar materials can be made using ethylenedichloride and ammonia or ethylenediamine, along with a base. These materials produce significant salt byproducts and may also give some quaternary nitrogens.

Polymerization of aziridine produces highly branched polyamines with nearly equal quantities of primary, secondary and tertiary nitrogens. In addition to the problems cited for condensation reactions, the monomer is highly toxic, carcinogenic and explosive.

German Patent Application DE 4030-380-A discloses an anionic N-vinylformamide polymerization process using a basic catalyst to form primarily an NVF dimer and an oligomer with a hydrolytically unstable nitrogen containing backbone.

M. Sawamoto, TRIP 1 No 4, April 1993, 111-115 discloses cationic polymerization of vinyl monomers using an initiator such as a protonic acid or metal halide. Hashimoto, et al., Poly. Sci., 26, 3361-3374 (1988) disclose cationic polymerization of functional vinyl ethers with pendant primary amino groups in which phthalimide is used as a protecting group for the amino pendant. The polymerization is initiated using a hydrogen iodide/iodine (HI/I$_2$) system.

SUMMARY OF THE INVENTION

The present invention is a cationic polymerization (or cationically initiated polymerization) process for the synthesis of vinylamide oligomers or low molecular weight polymers; i.e. molecular weights from about 280 to 7,500, referred to collectively herein as "oligomers". Vinylamide monomeric units are reacted in the presence of a Lewis acid catalyst, optionally in the presence of a solvent, at a temperature between −100° C. and 100° C. to form the corresponding vinylamide oligomer. The ability to cationically polymerize vinylamides to form oligomers is unexpected in view of the failure of other prior art polymerization processes to make such products. The resultant vinylamide oligomers are characterized in that they have a proton initiating group, such as a methyl group, on the initiating terminus and an aldehyde equivalent at the terminal end. These vinylamide oligomers can subsequently be hydrolyzed under acidic or basic conditions to form the corresponding vinylamine oligomers. This process is especially useful for synthesizing oligomers of N-vinylformamide which can be hydrolyzed to form the corresponding vinylamine oligomers which exhibit unusual water sensitivity (hydroscopic) and rapid solution, as well as high reactivity, uniformity and light and color stability.

DETAILED DESCRIPTION OF THE INVENTION

We have found that oligomeric vinylamides can be made by cationically polymerizing N-vinylamides at moderate to subambient temperatures using Lewis acid catalysts. The N-vinylamides can be polymerized neat, or optionally in the presence of an inert solvent such as ethers, alkanes, chloroalkanes, aromatics, mixtures thereof and the like. The cationic polymerization can be carried out over a wide range of temperatures, generally from about −100° C. to 100° C., and preferably from about 0° to 50° C.

When using a solvent, the reaction can be done as a precipitation or a dispersion polymerization. With halocarbon solvents (e.g., chloroform or methylene chloride) the NVF is initially miscible, but oligomer separates as a solid during the reaction. This process tends to produce oligomer at the lower molecular weight end. In the case of hydrocarbons, such as pentane, the NVF is a separate dispersed phase and polymerizes as discrete small particles. A suspending or emulsifying agent of low HLB is preferentially added to prevent coalescence of the oligomer particles during the reaction. In carrying out the polymerization, the heat of reaction should be removed at a rate equal to or greater than the rate of heat production in order to prevent thermal runaway of the reaction. Polymerization under these conditions produces vinylamide oligomers having molecular weights from about 280 to 7,500, and preferably from 600 to 2,500, with the specific product molecular weight depending upon monomer concentration, catalyst type and level, and reaction temperature.

The resulting vinylamide oligomers are unique compositions which contain a proton initiating group, such as a methyl group, on the initiating terminus and an aldehyde equivalent at the terminal end. These oligomers can be represented by the structural formula:

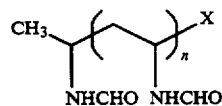

wherein n is from 1 to 100 and X is an aldehyde equivalent. Some preferred examples of the aldehyde equivalent X, include:

and

wherein Y is the anionic component of the catalyst system, such as Cl−, F−, −O$_2$CCF$_3$ and the like.

The oligomers can be dissolved to over 50% solids with quite low viscosity and can be readily hydrolyzed under acid or base conditions to give the corresponding vinyl amine or its acid salts. These compounds on acid or base hydrolysis release aldehyde or aldehyde equivalent functionality which is unique and valuable for the further modification or use of these materials.

The oligomers have unusual water sensitivity (hydroscopic) and rapid solution, better reactivity, uniformity, light and color stability than prior high amine containing oligomers, and an all-primary amine content, offering higher, more uniform reactivity than mixed amine compounds of the prior art. The oligomers are additionally unique in having aldehyde equivalent end groups and in being free of halogens and sulfur compounds present in prior art attempts to make oligomeric materials with other monomers. The aldehyde equivalents on each chain further distinguish the potential applications of these materials in that they allow covalent attachment of these materials to appropriate other molecules, including acetal formation with diols and polyols (e.g., cellulosics like wood and paper, PVOH, glycerol monoesters of fatty acids) or by reaction with amine or amide or thiol groups, e.g., in skin, hair and other biological surfaces. The aldehyde equivalent groups can also be reacted with amine or diamine groups on other chains to increase the molecular weight of the oligomers. The aldehyde equivalent groups can also be reacted with bisulfite or phosphite or be oxidized to carboxylate to generate anionic content on the oligomer. The groups can presumably also be reduced to generate an alcohol, e.g., for preparing p-urethane derivatives.

The vinyl groups of certain of these oligomers may be potentially used to reinitiate cationic or free radical polymerizations with other monomers, giving unique block copolymers.

Previous attempts at making low molecular weight N-vinylformamide included the use of large amounts of unwanted chain transfer agents, free radical initiators, high temperatures or high dilution conditions. Such conditions give predominately materials over 8,000–10,000 MW, produce color because the monomer decomposes via ionic processes at high temperature and tend to leave large amounts of halogen or sulfur residues on the low polymers as well as admixed and difficultly removable byproducts. These promote corrosion and color and decrease stability. Polydispersities are also frequently large. Polymers containing mixtures of primary, secondary and tertiary amine groups (e.g., PEI) have been prepared from hazardous aziridine monomer. Molecular weights are also typically much higher. Oxidatively unstable ethyleneamines (mainly secondary, with terminal primary amines) have been prepared by other routes and used previously. Several monomeric species such as $NH_2-(CH_2)_n-CH(OR)_2$ where n=1 to 4 which contain a single amine and aldehyde equivalent have been made, but these are significantly different in functionality and use, lacking, to name just one feature, the ability to contain multiple primary amine or formamide groups on each oligomer molecule. In none of the prior teachings are oligomers produced which have primary amine attached to the backbone and clean methyl groups at one end and an aldehyde or aldehyde equivalent at the other end.

The cationic polymerization is carried out using Lewis acid catalysts, i.e., compounds that can accept a pair of electrons, including Bronsted acids (i.e., compounds with high hydrogen ion donating capabilities), strong acid ion exchange resins, $AlCl_3$, $SnCl_4$, $BF_3$, chlorides, fluorides and other halides of Groups IIA, IIB, IIIA, IIIB, IVA, IVB, VB and VII elements such as aluminum, boron, antimony, tin, arsenic, iron, zinc, titanium, magnesium and silicon. These may also be advantageously present (U.S. Pat. No. 4,009,129) as coordination complexes with organic compounds containing donor atoms such as oxygen, e.g., ethers, such as $BF_3 \cdot Et_2O$. Additional possibilities are the oxyacids of sulfur, phosphorus, halogens and arsenic and the hydrogen halides such as HCl and HBr. Organic sulfonic acids, such as methanesulfonic, trifluoromethanesulfonic acid, etc.; organic derivatives of phosphorus oxyacids; and some carbon acids such as formic and trifluoroacetic acid are possibilities. Anhydrides and mixed anhydrides of the oxyacids are also effective. Acid oxides, such as acidic alumina acidic zeolites and clays may also be effective catalysts for the reaction. Well known examples of cationic initiator Lewis acids are set out in U.S. Pat. Nos. 3,139,098; 5,070,117 and 4,009,129. A large number of compounds are also known which generate catalytically effective groups for cationic polymerization on activation with light (U.S. Pat. Nos. 3,196,098; 4,009,129; 4,575,544; 4,096,056 and references therein) or under redox conditions (U.S. Pat. No. 4,192,924). The catalyst level in the reaction may vary from about 0.001 mol % to 10 mol %.

In preferred embodiments, the vinylamide monomer used in the reaction is N-vinylformamide (NVF). Cationic oligomers of vinylamides with other cationically polymerizable monomers can be synthesized with this process. These comonomers may be incorporated either via mixing with the NVF during polymerization to give random or alternating cooligomersor via known cationic block copolymerization techniques, especially where the NVF is the second monomer, added to increase the living chain lengths after the first monomer has been consumed. Examples of such other cationically polymerizable monomers include vinyl ethers, α-methylstyrene, isobutylene and other multiply alkyl substituted olefins. In such copolymerization reactions, mole ratios from 99:1 to 1:99 can be used with a preferred range being from 1–70 mole % NVF with 30–99% of cationically copolymerized monomer or mixtures of monomers.

The product of bulk polymerization of NVF is a hard, brittle solid which is highly soluble in water. Powdered product is in fact highly hygroscopic. The product can be dissolved to over 50% solids with quite low viscosity and can be readily hydrolyzed under acid or base conditions to give low molecular weight p-vinylamine or its acid salts. It shows nmr spectra essentially identical to those of typical free radical polymerized material.

Most prior attempts at vinylamide polymerization under cationic conditions have used tertiary amides which are much less likely to coordinate with the catalyst and deactivate it. Work with NVF itself has shown it to be highly unstable in the presence of acids and to undergo particularly facile degradation and hydrolysis with acid or base. It is surprising that polymerization can be done in a controlled manner and that the product is a colorless to slightly colored product if the heat evolution can be controlled. The ability to prepare low MW oligomers is not readily available via other means and the resulting oligomers in the hydrolyzed and unhydrolyzed forms are themselves unique oligomers not available by other means and with reactivity and properties unlike previously known materials. The presence of air is not seriously detrimental to the cationic polymerization, raising the possibility that this technology may have particular value in coatings and adhesives cured in-situ in an oxygen containing environment.

This form of polymerization allows one to prepare low molecular weight product. The extreme reactivity of this vinylamide apparently is enough to allow the cationic polymerization process to occur usefully rapidly in comparison to chain transfer and termination. The product can be used as the p-formamide or hydrolyzed to primary amine polymers which are not available by other means.

It is anticipated that these oligomers and cooligomers, hydrolyzed, partially hydrolyzed or unhydrolyzed, can be used as components of adhesives, binders, tie layers and coatings and as water soluble polymers in water treatment, papermaking, petroleum and mineral recovery, personal care and biomedical markets. Particular opportunities may be found in lube oil additives, detergents for fuels, curatives and curative precursors for isocyanate, aminoplast, anhydride, epoxide, aziridine, acetylacetate, Michael adduct and other reactive cure systems in adhesives, binders, coatings and bulk polymers. Utility of the materials in photoresist applications in microelectronics is also anticipated. They should be of interest as scavengers of metals, acids, aldehydes and ketones. The high water solubility suggests uses as humectants and components in superabsorbents. They can also be pre-reacted with a wide variety of functionalities, i.e., the above plus alkyl halides, esters and aldehydes to give derivative low molecular materials for use in coatings (e.g., cathodic electrocoat), adhesives, binders and other applications.

The following examples are presented to better illustrate the present invention and are not meant to be limiting.

EXAMPLES

Example 1. Reaction of NVF with SnCl$_4$

A 19×65 mm vial was equipped with a small magnetic stirring bar, septum cap, thermocouple, syringe needles as N$_2$ inlet and outlet, and placed in an ice bath. To the vial was added 2 mL of 95% NVF. The sample was cooled to 5° C. and treated with a small amount of SnCl$_4$ (Aldrich Chemical Co.). Several additions of small droplets of tin chloride produced little temperature rise and the bath was removed. Small additional amounts of catalyst were added (total ≈0.2 mL) and the temperature climbed slowly to 36° C., whereupon the vial was placed in a water bath. The sample turned slightly yellow and showed some small particles or bubbles and slowly became more viscous. After 14 hours the sample was a brittle glassy solid which was highly soluble in water or DMSO, but precipitated in MeOH (picks up moisture and dissolves on removal of MeOH). $^1$H nmr in DMSO-d$_6$ showed the expected peaks at δ7.9, 3.7 and 1.4 ppm for PNVF. Small amounts of unreacted NVF monomer were also present.

Example 2. Reaction of NVF with SnCl$_4$—larger scale

To 10 g of NVF in a 25 mL flask equipped as above was added 0.1 mL of SnCl$_4$ at 0.8° C. After 5 min the sample was transferred to a water bath at 21° C. The sample was maintained at 21°-28° C. for 25 hours and became viscous and orange in color. On heating in a 52°-55° C. bath, the sample increased to 72° C. and then cooled to bath temperature over 2.5 hours. The orange brittle solid was highly soluble in water and on gpc analysis in water gave a broad peak in the range of 2500 and 975 Mw polyethylene glycol (PEG) standards, tailing to lower Mw. NMR analysis again showed PNVF with a little formamide.

Example 3. Reaction of NVF with BF$_3$·Et$_2$O

Using the setup of Example 1, but substituting somewhat less than 0.1 mL of BF$_3$·Et$_2$O (Aldrich) at 11° C., the temperature rose to 17° C. and dropped back. The sample was allowed to react in a water bath at 23°-27° C. Over 30 min the sample became very thick; overnight the sample became a nearly colorless brittle solid. The sample formed an over 50 wgt % solution in water with modest viscosity. GPC analysis after neutralizing the sample showed several peaks, mainly low molecular weight (longer retention time) than 975 Mw PEG. Nmr showed PNVF.

Comparison Example 3. Reaction of NVF with BF$_3$·Et$_2$O without Temperature Control The procedure of Example 3 was removed from the ice bath and allowed to warm. After 2 min the reaction rapidly increased in temperature to 139° C., turning dark orange/red and giving off enough gas to blow off the septum.

Example 4. Reaction of NVF with Strong Acid (Sulfonic Acid Ion Exchange Resin)

NVF, 2 mL (95%) was placed in a 13 mL vial in an insulated foam block. A 1/16" dia. thermocouple was used to follow temperature. Approx. 30 small beads of Rohm and Haas A-15 macroreticular strong acid ion exchange resin were added. The temperature was monitored with occasional stirring and climbed from 25° C. to 86° C. over about 1 hour. The beads darkened, but the monomer color remained good and the sample thickened considerably. Three days later the sample was very hard and adhered tightly to the thermocouple.

Comparison Example 4. Control Reaction of NVF with Strong Acids without Temperature Control NVF, 2 mL (95%) was placed in a 13 mL vial in an insulated foam block. A 1/16" dia. thermocouple was used to follow temperature and stir the mixture. One drop of sulfuric acid was added to the vial, giving a rapid temperature rise to 70° C. The temperature remained at 55°-65° C. for 30-50 sec, then rose over 15 sec to 170° C., accompanied by darkening of the solution and smoke and gas evolution. Similar results were obtained with one drop of concentrated HCl.

Example 5. Hydrolysis of PNVF

To approximately 1.3 g of the example 3 product in 3 mL of water was added 1.43 g (18.3 mmol) of 50% NaOH. the sample became warm, solids formed and redissolved. The hydrolysis was followed by titrating small aliquots with HCl, indicating slow reaction after an initial 50% fast reaction. The next day the sample was heated 2 hours at 60° C. and 3 hours at 80° C. The sample was treated with conc HCl to precipitate the hydrochloride salt, but only a small amount of solid precipitated. Cooling precipitated additional solids and concentration gave somewhat yellow brittle foam.

Example 6. Polymerization of NVF in Diethyl Ether

To a 100 mL 3-neck flask equipped with a large magnetic stirrer, nitrogen blanket, ice bath, thermocouple and reflux condenser was added 50 mL of fresh anhydrous Et$_2$O and 20.2 g of NVF. The solution was cooled to 7.6° C. and about 0.28 mL of BF$_3$·Et$_2$O was added slowly without a noticeable temperature change. The ice bath was replaced with a water bath. No exotherm was noted, but the solution became turbid and sticky solids began to form after 20 min. The sample was allowed to react overnight in the water bath to give a hard, but slightly spongy solid (ether had largely evaporated). The material dissolved in water with agitation to a low viscosity solution.

Example 7. Copolymerization of NVF with Butyl Vinyl Ether

To a 4 dram vial with magnetic stir bar, septum cap and nitrogen inlet and exit needles was added 1.3 mL of butyl vinyl ether and 0.7 mL of NVF (1:1 molar ratio). The sample was cooled to 5.6° C. and treated with a few small drops of BF$_3$·Et$_2$O. A momentary 2° temperature rise was noted, but reaction was slow even at 23° C. and a total of 0.2 mL of BF$_3$·Et$_2$O was added. The reaction was easily controlled by a water bath at 23°-30° C. and increased in viscosity and became murky and slightly yellow over 1 hour. After 16 hours the product was a hard waxy solid. Addition of a small amount of water gave a small lower layer and a hazy yellow upper layer. The top layer was largely soluble in hexanes, while the bottom was not. $^1$H NMR (CD$_3$OD): δ8.0, 3.95, 3.45, 1.9-1.3, 1.1, 0.9 ppm; the hexane soluble layer had relatively low δ8.0, 3.95, 1.9-1.3 peaks, indicating lower incorporation of NVF, while the less hexane soluble fraction was rich in these signals, indicating higher NVF incorporation. Clearly oligomer was formed in high yield, but composition drift was observed.

Example 8. Polymerization of NVF (neat) Initiated by Trifluoroacetic Anhydride

NVF was dried over activated 4 Å molecular sieves (10 g molecular sieves per 15 mL NVF, filtered under nitrogen, then distilled under high vacuum (60° C., 50 mtorr) immediately prior to use. The molecular sieves were activated by heating at 210° C. under high vacuum for 24 hours. Trifluoroacetic anhydride was fractionally distilled under nitrogen prior to use. Dry NVF (3.59 g, 3.54 mL, 50.6 mmol) was charged to a flame dried, nitrogen purged, round-bottom flask and cooled to −5° C. After 20 min, trifluoroacetic anhydride (0.013 mL) was added via syringe, and the mixture was stirred at −5° C. for 24 hours. During this time period, the reaction mixture became very viscous. MNR indicated 80% conversion. Anhydrous dimethylformamide (15 mL) was added to the oligomer mixture to produce a turbid solution (the oligomer did not completely dissolve). Then 2M LiBH$_4$ in THF (0.023 mL) was added via syringe to terminate the reaction, and the reaction mixture was stirred at room temperature for 2 hours. The dimethylformamide was removed under vacuum (40° C.), the oligomer (2.3 g) was dissolved in distilled water (3.5 mL) and slowly precipitated into a beaker of vigorously stirring THF. The precipitated oligomer was filtered, washed with THF, and quickly transferred into a dry flask, then dried at 140° C. and 500 mtorr for 24 hours. Oligomer yield after precipitation was 70% (1.60 g of clean oligomer was recovered from 2.3 g of crude oligomer). $^1$H NMR clearly shows the methyl group at the head of the oligomer at δ0.8 ppm and small amounts of vinyl and bisamidal at δ6.6, 5.5, 5.4–5.0 ppm, Mw=2,330; Mw/Mn=2.9.

Example 9. Polymerization of NVF Initiated by Trifluoroacetic Anhydride in Chloroform Diluent NVF was dried over activated 4 Å molecular sieves (10 g of molecular sieves per 15 mL NVF), filtered under nitrogen, then distilled under high vacuum (60° C., 50 mtorr) immediately prior to use. The molecular sieves were activated by heating at 210° C. under high vacuum prior to use. Chloroform was purified by washing three times with conc. H$_2$SO$_4$, then water, then bicarbonate solution, drying over anhydrous MgSO$_4$, stirring for 12 hours at 25° C. over P$_2$O$_5$, then distilled from P$_2$O$_5$ under nitrogen. Dry NVF (2.95 mL) and chloroform (2.4 mL) were charged to a flame dried, nitrogen purged, round-bottom flask via syringe, and the reaction contents were cooled to −20° C. Trifluoroacetic anhydride (0.02 mL) was added via syringe, and the reaction was allowed to continue at −20° C. for 87 hours. NMR indicated the conversion after 87 hours to be 56% (note that the solution became very viscous after 48 hours). Anhydrous dimethylformamide (15 mL) was added to the oligomer mixture to produce a turbid solution (the oligomer did not completely dissolve). Then 2M LiBH$_4$ in THF (0.023 mL) was added via syringe to terminate the reaction, and the reaction mixture was stirred at room temperature for 2 hours. The dimethylformamide was removed under vacuum (40° C.), the oligomer (1.7 g) was dissolved in distilled water (3 mL) and slowly precipitated into a beaker of vigorously stirring THF. The precipitated oligomer was filtered, washed with THF, and quickly transferred into a dry flask, then dried at 140° C. and 500 mtorr for 24 hours. Oligomer yield after precipitation was 64% (1.1 g of oligomer was recovered from 1.7 g of crude oligomer). $^1$H NMR of the oligomer clearly shows the methyl group at the head of the oligomer. Mw=1,582; Mw/Mn=2.1

Example 10. Polymerization of NVF as a Thin Film

NVF monomer treated with a small amount of coating additive (3M Co. FC-430) to improve wetting was drawn down as a thin film on an acetone washed aluminum panel. The sample was placed in a steel pan was covered with a sheet of clear plastic film. A small drop of trifluoroacetic anhydride (bp 40° C. ) was introduced through the plastic film and gave rapid cure of the NVF film. The initially hard film became soft and very tacky on exposure to atmospheric moisture.

Example 11. Coreaction of NVF with a Difunctional Vinyl Ether

A mixture of NVF monomer and Rapicure CHVE (ISP Technologies 1,4-di(vinyloxymethyl)cyclohexane) was treated in a vial with septum cap with BF$_3$·Et$_2$O and maintained below 30° C. The product was a clear, brittle solid after 48 hours.

Having thus described the present invention, what is now deemed appropriate for Letters Patent is set out in the following appended claims.

We claim:

1. An N-vinyl formamide oligomer having a weight average molecular weight of from about 280 to 7,500 wherein said oligomer has a proton initiating group on the initiating terminus and an aldehyde equivalent at the terminal end.

2. The oligomer of claim 1 wherein said proton initiating group is a methyl group.

3. The oligomer of claim 1 wherein said aldehyde equivalent is a cyclic bisamidal group.

4. The oligomer of claim 1 which has the structural formula:

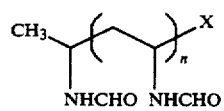

wherein n is from 1 to 100 and X is HC=CH—NHCHO;

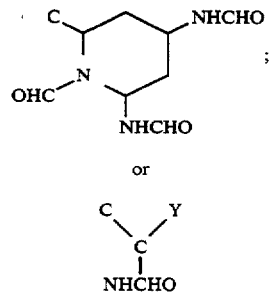

wherein Y is the anionic component of the catalyst system.

5. The oligomer of claim 4 wherein Y is selected from the group consisting of Cl—, F—, —O$_2$CCF$_3$.

6. The oligomer of claim 1 which contains one or more other cationically copolymerizable monomer units.

7. The oligomer of claim 6 wherein said other cationically copolymerizable monomer units are selected from the group consisting of vinyl ethers, α-methylstyrene, isobutylene, and multiply substituted olefins.

8. The oligomer of claim 1 which has a weight average molecular weight of from 500 to 2,500.

* * * * *